United States Patent
Shepelev (10) Patent No.: US 10,191,584 B2
(45) Date of Patent: Jan. 29, 2019

(54) REDUCING CONNECTIONS FROM A SENSING MODULE

(71) Applicant: Synaptics Incorporated, San Jose, CA (US)

(72) Inventor: Petr Shepelev, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 78 days.

(21) Appl. No.: 15/629,493

(22) Filed: Jun. 21, 2017

(65) Prior Publication Data

US 2018/0373379 A1    Dec. 27, 2018

(51) Int. Cl.
*G06F 3/041*    (2006.01)
*G06F 3/044*    (2006.01)
*G09G 3/36*    (2006.01)

(52) U.S. Cl.
CPC ............ *G06F 3/0416* (2013.01); *G06F 3/044* (2013.01); *G06F 3/0412* (2013.01); *G09G 3/3648* (2013.01); *G09G 2310/0297* (2013.01)

(58) Field of Classification Search
CPC combination set(s) only.
See application file for complete search history.

(56) References Cited

U.S. PATENT DOCUMENTS

| | | | |
|---|---|---|---|
| 9,946,404 B1* | 4/2018 | Berget | G06F 3/0418 |
| 2017/0285789 A1* | 10/2017 | Barel | G06F 3/0412 |
| 2017/0285790 A1* | 10/2017 | Barel | G06F 3/0412 |
| 2017/0344173 A1* | 11/2017 | Tang | G06F 3/017 |

\* cited by examiner

*Primary Examiner* — Van N Chow
(74) *Attorney, Agent, or Firm* — Ferguson Braswell Fraser Kubasta PC (57) ABSTRACT

An input device, including: a first glass layer; a plurality of transmitter electrodes disposed on the first glass layer and configured for capacitance sensing; a second glass layer; a plurality of receiver electrodes disposed on the second glass layer and configured for capacitance sensing; and a multiplexer disposed on the first glass layer and coupled to a plurality of sources and a sensing channel, where the multiplexer selectively couples one of the plurality of sources to the sensing channel based on at least a control signal, and where the plurality of sources includes the plurality of transmitter electrodes and the plurality of receiver electrodes.

20 Claims, 6 Drawing Sheets

REDUCING CONNECTIONS FROM A SENSING MODULE

TECHNICAL FIELD

The described embodiments relate generally to electronic devices, and more specifically, to the use of a multiplexer in the coupling of a sensing module to an integrated controller (IC) (e.g., touch IC) within an input device.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may be used to detect finger, styli, or pens.

These input devices often include sensing modules with many connections to ICs (e.g., touch ICs). These many connections are costly and occupy valuable space in the input device.

SUMMARY

In general, in one aspect, one or more embodiments relate to an input device. The input device comprises: a first glass layer; a plurality of transmitter electrodes disposed on the first glass layer and configured for capacitance sensing; a second glass layer; a plurality of receiver electrodes disposed on the second glass layer and configured for capacitance sensing; and a multiplexer disposed on the first glass layer and coupled to a plurality of sources and a sensing channel, wherein the multiplexer selectively couples one of the plurality of sources to the sensing channel based on at least a control signal, and wherein the plurality of sources comprises the plurality of transmitter electrodes and the plurality of receiver electrodes.

In general, in one aspect, one or more embodiments relate to a method for operating an input device. The method comprises: receiving, by a multiplexer disposed on first layer, a control signal, wherein the multiplexer is coupled to a sensing channel and a plurality of sources comprising: a plurality of transmitter electrodes disposed on the first layer; and a plurality of receiver electrodes disposed on a second layer; coupling, by the multiplexer and based on at least the control signal, the sensing channel with a source of the plurality of sources; and relaying, by the multiplexer, a resulting signal corresponding to capacitance sensing from the source to an integrated controller (IC) coupled to the sensing channel.

In general, in one aspect, one or more embodiments relate to a method of manufacturing an input device. The method comprises: disposing transmitter electrodes configured for capacitive sensing on a thin-film transistor (TFT) glass layer; disposing a plurality of receiver electrodes configured for capacitive sensing on a color filter glass layer; disposing a multiplexer on the TFT glass layer; coupling the multiplexer to the plurality of receiver electrodes by a first flexible printed circuit (FPC); coupling the multiplexer to the plurality of transmitter electrodes; and coupling an integrated controller (IC) to the multiplexer by a sensing channel, wherein the multiplexer couples, based on a control signal provided by the IC, the sensing channel to a source of a plurality of sources comprising the plurality of receiver electrodes and the plurality of transmitter electrodes.

Other aspects of the embodiments will be apparent from the following description and the appended claims.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, brief summary, brief description of drawings, or the following detailed description.

Various embodiments provide input devices and methods that may facilitate improved usability along with various other benefits.

Figure 1:
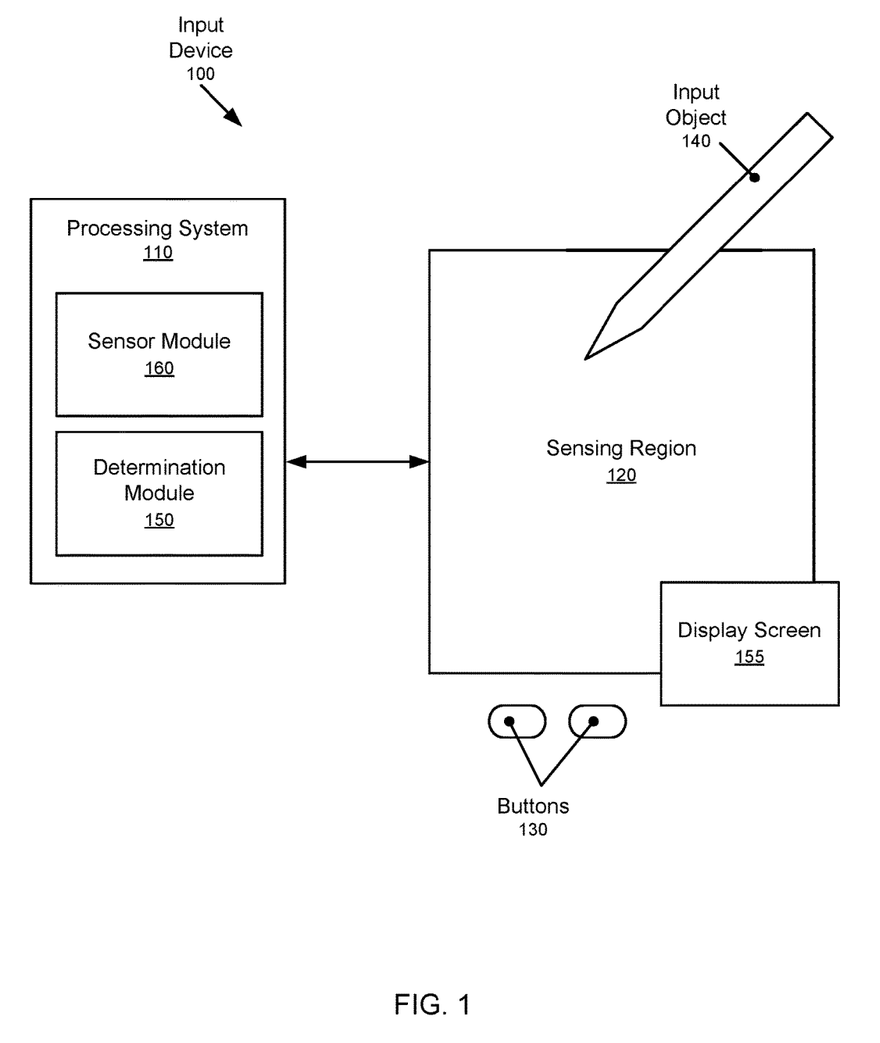
FIG. 1 shows a block diagram of an input device in accordance with one or more embodiments.

FIG. 1 is a block diagram of an exemplary input device (100), in accordance with embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

In FIG. 1, the input device (100) is shown as a proximity sensor device (e.g., "touchpad" or a "touch sensor device") configured to sense input provided by one or more input objects (140) in a sensing region (120). Example input objects include styli, an active pen, and fingers. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element (s) of the input device (100). In other embodiments, components of processing system (110) are physically separate with one or more components close to the sensing element (s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens (155), driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens (155), data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2:
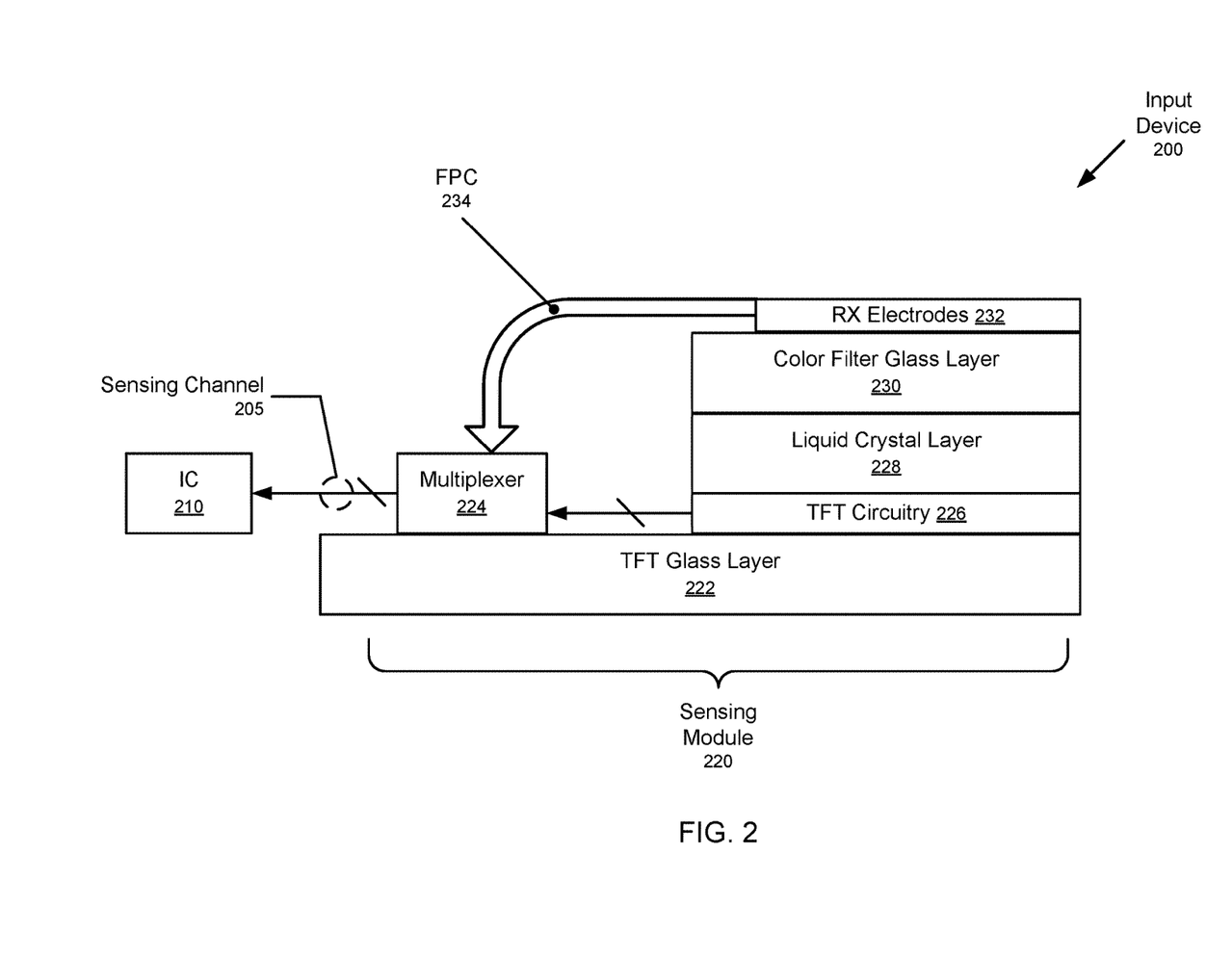
FIG. 2 shows a block diagram of a sensing module in an input device in accordance with one or more embodiments.

FIG. 2 shows an input device (200) in accordance with one or more embodiments. As shown in FIG. 2, the input device (200) includes a sensing module (220) coupled to an integrated controller (IC) (210) via a sensing channel (205). The sensing module (220) may be used to implement all or a part of the sensing region (120), discussed above in reference to FIG. 1. The sensing module (220) may also be used to generate a display for all or part of the display screen (155), also discussed above in reference to FIG. 1. Further, the IC (210) may be a component of the processing system (110). For example, the IC (210) may be a component of the sensor module (160) and/or the determination module (150), discussed above in reference to FIG. 1.

In one or more embodiments, the sensing module (220) has multiple layers including a color filter glass layer (230), a liquid crystal layer (228), and a thin-film transistor (TFT) glass layer (222). The sensing module (220) may have additional layers and components not shown. In one or more embodiments, multiple receiver (RX) electrodes (232) are disposed on the color filter glass layer (230). These receiver electrodes (232) are used in capacitance sensing (e.g., absolute capacitance sensing, mutual capacitance sensing, etc.). In one or more embodiments, TFT circuitry (226) is disposed on the TFT glass layer (222). The TFT circuitry (226) may include transmitter electrodes used in capacitance sensing (e.g., absolute capacitance sensing, mutual capacitance sensing, etc.). Additionally or alternatively, the transmitter electrodes used in capacitance sensing may be disposed on the TFT glass layer separate from the TFT circuitry (226).

In one or more embodiments, the transmitter electrodes in the TFT circuitry (226) and the receiver electrodes (232), together, implement mutual capacitance sensing. In other words, a waveform is driven onto the transmitter electrodes and a resulting signal(s) is received from the receiver electrodes (232). The resulting signal is a function of the waveform and change in capacitance between the transmitter electrodes and receiver electrodes (232) due to the presence of an input object.

In one or more embodiments, the receiver electrodes (232) are operated to perform absolute capacitance sensing independent of the transmitter electrodes. In one or more embodiments, the transmitter electrodes are operated to perform absolute capacitance sensing independent of the receiver electrodes (232).

In one or more embodiments, the TFT circuitry (226) includes source lines and gate lines that, along with the color filter glass layer (230), the liquid crystal layer (228), and other circuitry/layers (not shown), are configured to generate a display. In one or more embodiments, one or more source lines and/or one or more gate lines are also operated to perform absolute capacitance sensing.

In one or more embodiments, the sensing module (220) includes a multiplexer (MUX) (224). The MUX (224) may be disposed on the TFT glass layer (222). The MUX (224) is coupled to the sensing channel (205) and multiple sources. For example, the MUX (224) may be coupled to the receiver electrodes (232) via a flexible printed circuit (FPC) (234) that reaches between the TFT glass layer (222) and the color filter glass layer (230). The FPC (234) may connect directly to the MUX (224). Additionally or alternatively, the FPC (234) may connect to traces on the TFT glass layer (222) that connect to the MUX (224). The MUX (224) may also be coupled to one or more of the transmitter electrodes in the TFT circuitry (226), the source lines in the TFT circuitry (226), and the gate lines in the TFT circuitry (226) (e.g., via wires, traces, etc.). In one or more embodiments, the MUX (224) is part of the TFT circuitry (226).

Although not shown in FIG. 2, the MUX (224) inputs a control signal. The MUX (224) connects the sensing channel (205) to one of the sources (e.g., receiver electrodes (232) via the FPC (234), transmitter electrodes in TFT circuitry (226), gate lines in TFF circuitry (226), and/or source lines in TFT circuitry (226)) based on the control signal. The MUX (224) relays a resulting signal (corresponding to absolute capacitance sensing or mutual capacitance sensing) from the selected source to the IC (210) via the sensing channel (205).

In one or more embodiments, the input device (200) includes the IC (210). In one or more embodiments, the IC (210) is disposed on the TFT glass layer (222). Additionally or alternatively, the IC (210) may be disposed on another FPC (not shown).

The IC (210) may be a touch IC configured to perform capacitance sensing. In such embodiments, the IC (210) may drive electrodes and receive resulting signals from electrodes, via the sensing channel (205), to determine the presence and/or position of an input object (e.g., input object (140), discussed above in reference to FIG. 1.).

In one or more embodiments, the IC (210) is a touch and display driver IC. In such embodiments, the IC (210) is configured to both perform capacitance sensing, as discussed above, and generate a display by driving the TFT circuitry (226).

Those skilled in the art, having the benefit of this detailed description, will appreciate that the MUX (224) reduces the number of the connections (e.g., wires) needed from the sensing module (220) to the IC (210). This reduces both cost and space. Although the sensing module (220) shown in FIG. 2 may be classified as a hybrid in-cell module, in other embodiments (not shown), the sensing module (220) corresponds to a full in-cell module or any touch sensor structure.

Although FIG. 2 shows the input device (200) as having a single sensing module (220), in one or more embodiments, the input device (200) has multiple sensing modules. Further, although FIG. 2 shows the IC (210) coupled to a single sensing channel (205) and sensing module (220), in one or more embodiments, the IC (210) is coupled to multiple sensing channels and sensing modules.

Figure 3:
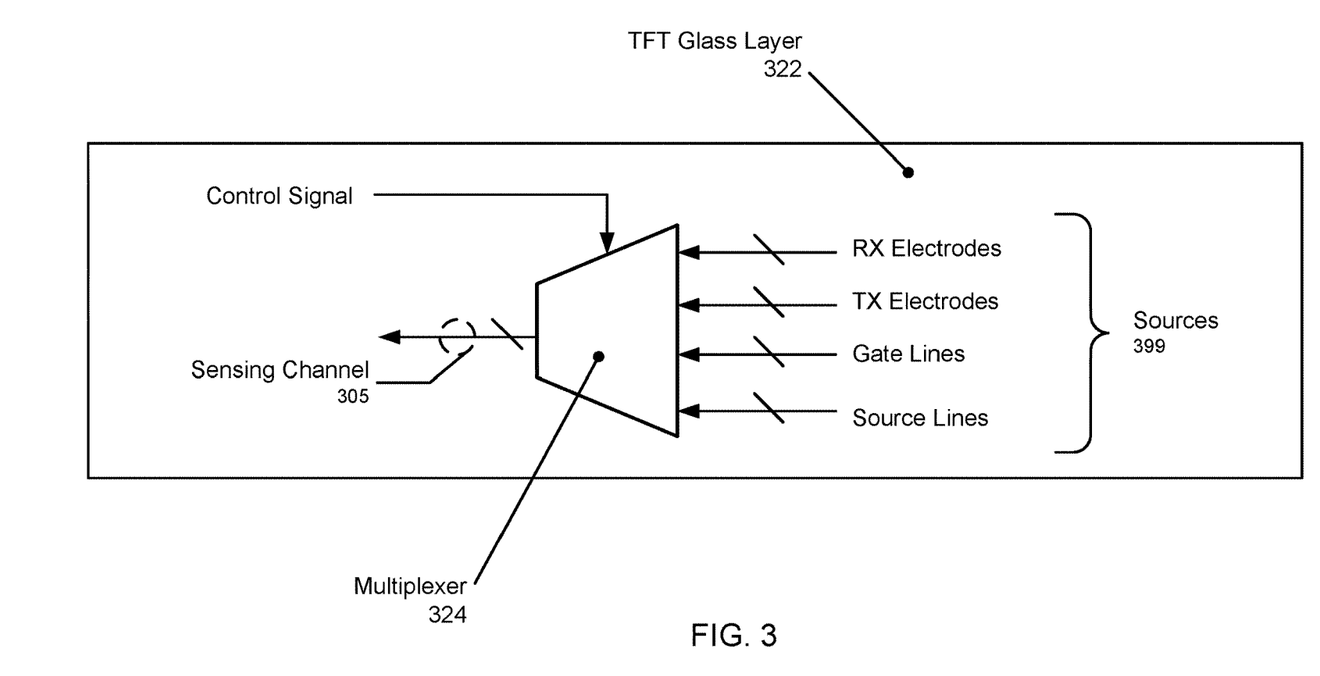
FIG. 3 shows a TFT glass layer in accordance with one or more embodiments.

FIG. 3 shows a TFT glass layer (322) in accordance with one or more embodiments. The TFT glass layer (322) may correspond to the TFT glass layer (222), discussed above in FIG. 2. A MUX (324) is disposed on the TFT glass layer (322). Further, the MUX (324) may correspond to the MUX (224), discussed above in reference to FIG. 2. As shown in FIG. 3, the MUX (324) is coupled to multiple sources (399) and a sensing channel (305). Moreover, the MUX (324) is operated by a control signal which selects one source of the sources (399) to connect to the sensing channel (305). The sensing channel (305) is coupled to an IC (not shown).

Figure 4A:
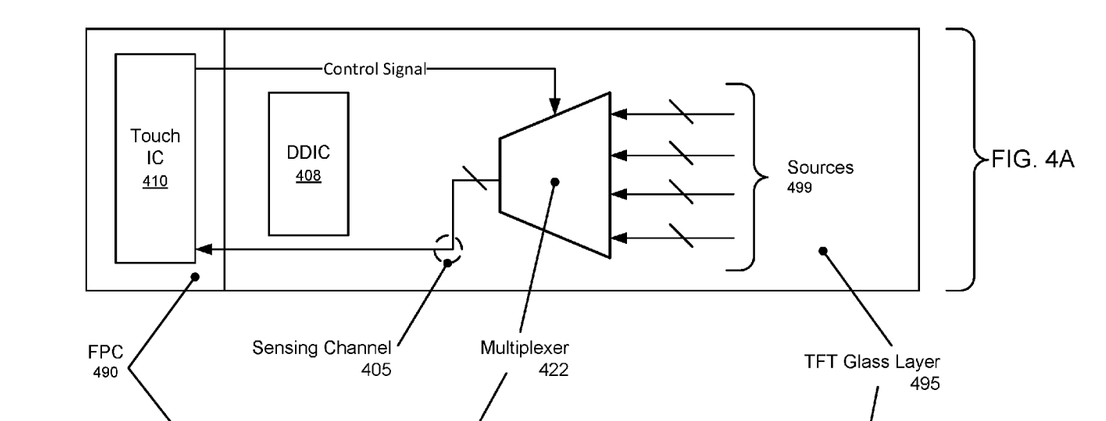
FIGS. 4A and 4B show block diagrams of an input device in accordance with one or more embodiments.
Figure 4B:
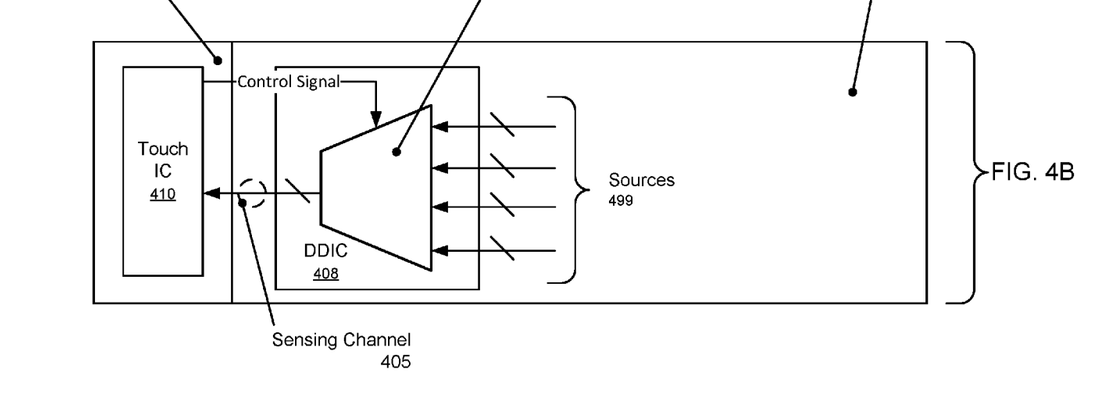

FIG. 4A and FIG. 4B each show a TFT glass layer (495) in accordance with one or more embodiments. The TFT glass layer (495) may correspond to the TFT glass layer (322), discussed above in reference to FIG. 3. Further, as shown in both FIG. 4A and FIG. 4B, a multiplexer (MUX) (422) is disposed on the TFT glass layer (495). The MUX (422) is coupled to multiple sources (499) and a sensing channel (405). The MUX (422), the sources (499), and the sensing channel (405) may correspond to the MUX (322), the sources (399), and the sensing channel (305), respectively, discussed above in reference to FIG. 3.

As shown in FIG. 4A and FIG. 4B, a flexible printed circuit (FPC) (490) is coupled to the TFT glass layer (495). A touch IC (410) is disposed on the FPC (490). The touch IC (410) is coupled to the sensing channel (405). Moreover, the touch IC (410) provides (e.g., outputs) the control signal to operate the MUX (422) (i.e., connect the sensing channel (405) to one of the sources (499)). As discussed above, the touch IC (410) may determine the presence and location of an input object based on a resulting signal(s) received over sensing channel (405) from a selected source.

As shown in FIGS. 4A and 4B, a display driver IC (DDIC) (408) is disposed on the TFT glass layer (495). The display driver IC (408) is configured to drive the TFT circuitry (e.g., TFT circuitry (226), discussed above in reference to FIG. 1) and generate a display. In FIG. 4A, the MUX (422) is external to the DDIC (408) and the control signal and the sensing channel (405) are routed around the DDIC (408). In FIG. 4B, the MUX (422) is internal to the DDIC (408) and the control signal and the sensing channel (405) are routed through the DDIC (408) to reach the MUX (422).

Figure 5A:
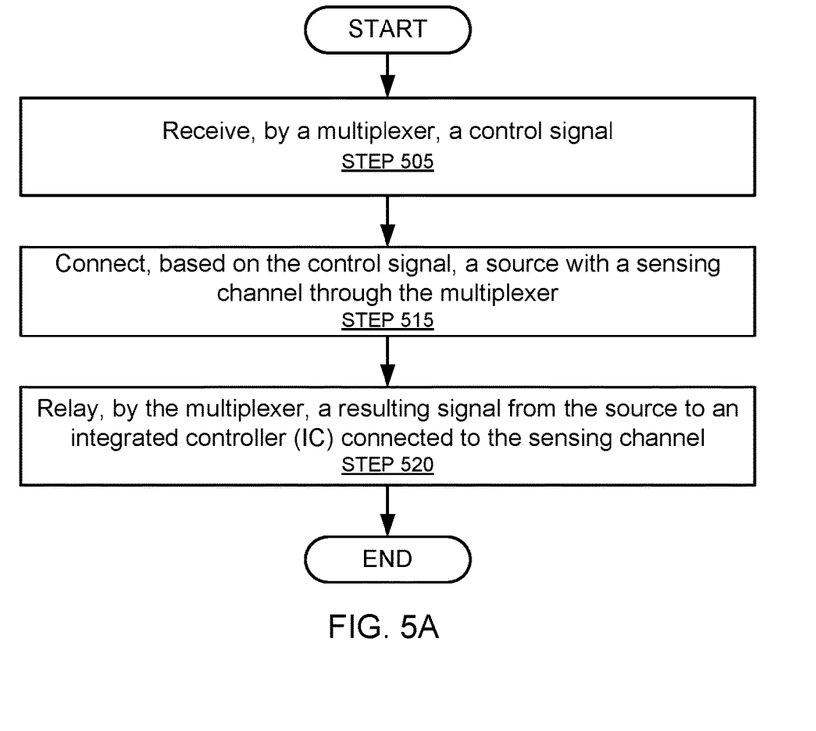
FIGS. 5A and 5B show flowcharts in accordance with one or more embodiments.

FIG. 5A shows a flowchart in accordance with one or more embodiments. The flowchart of FIG. 5A depicts a method for operating an input device. One or more of the steps in FIG. 5A may be performed by the components of the input device (200), discussed above in reference to FIG. 2. In one or more embodiments, one or more of the steps shown in FIG. 5A may be omitted, repeated, and/or performed in a different order than the order shown in FIG. 5A. Accordingly, embodiments should not be considered limited to the specific arrangement of steps shown in FIG. 5A.

Initially, a control signal is received by a multiplexer (STEP 505). The control signal may be provided by a touch IC or a touch and display driver IC of the input device. Moreover, the multiplexer may be a component in a sensing module of the input device and coupled to multiple sources.

For example, the multiplexer may be disposed on a TFT glass layer of the sensing and coupled to TFT circuitry, also disposed on the TFT glass layer, including transmitter electrodes, source lines, and gate lines. The multiplexer may also be coupled to receiver electrodes, disposed on a color filter glass layer of the sensing module, via a flexible printed circuit.

In STEP 515, the multiplexer connects a source (e.g., transmitter electrodes, receiver electrodes, source lines, gate lines, etc.) to a sensing channel based on the control signal. In other words, the control signal forces the multiplexer to select one of the sources and connect the selected source to the sensing channel. The sensing channel is the data connection (e.g., wires, traces, etc.) between the touch IC or the touch and display driver IC and the multiplexer.

In STEP 520, the multiplexer relays resulting signals from the selected source to the sensing channel. If the receiver electrodes are the selected source, the resulting signals are from the receiver electrodes while performing absolute capacitance sensing. Additionally or alternatively, the resulting signals are from the receiver electrodes while performing mutual capacitance sensing with the transmitting electrodes. If the transmitting electrodes are the selected source, the resulting signals are from the transmitting electrodes while executing absolute capacitance sensing. If the source lines and/or gate lines are the selected source, the resulting signals are from the source lines and/or gate lines while they are performing absolute capacitance sensing.

In one or more embodiments, the touch IC or touch and display driver IC may process the resulting signals to identify the presence and location of an input object touching or near the input device. In one or more embodiments, the process depicted in FIG. 5A may be repeated multiple times, and each time a different source may be selected. The resulting signals from one, two, or all of the sources may be used to determine the presence and location of an input object.

Figure 5B:
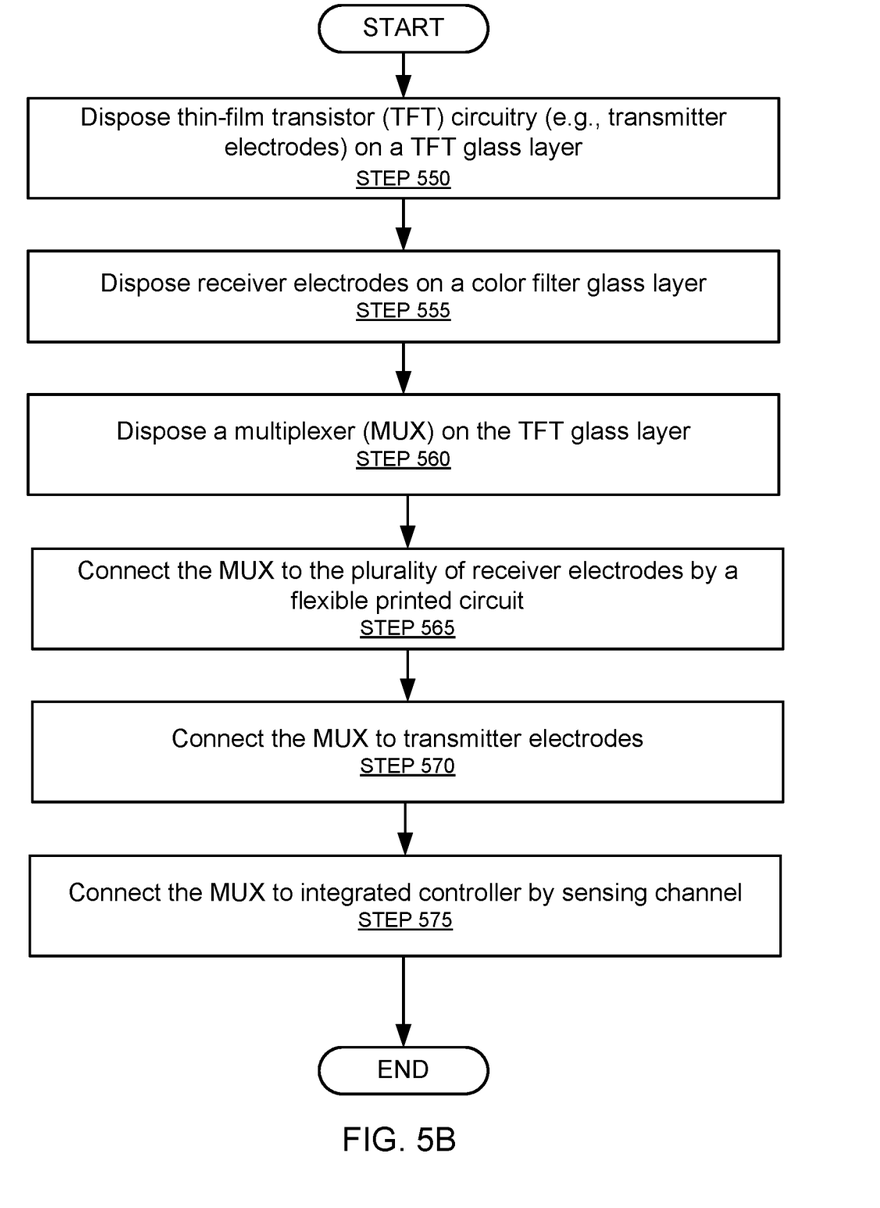

FIG. 5B shows a flowchart in accordance with one or more embodiments. The flowchart of FIG. 5B depicts a method of manufacturing an input device. The result of executing the process of FIG. 5B may correspond to the input device depicted in any of FIG. 2, FIG. 3, or FIG. 4. In one or more embodiments, one or more of the steps shown in FIG. 5B may be omitted, repeated, and/or performed in a different order than the order shown in FIG. 5B. One or more steps may be performed in parallel. Accordingly, the embodiments should not be considered limited to the specific arrangement of steps shown in FIG. 5B.

Initially, TFT circuitry with transmitter electrodes, source lines, and gate lines are disposed on a TFT glass layer (STEP 550) of a sensing module. In STEP 555, receiver electrodes are disposed on a color filter glass layer of the sensing module. In STEP 560, a multiplexer is also disposed on the TFT glass layer. In STEP 565, the multiplexer is coupled to the receiver electrodes via a flexible printed circuit. In STEP 570, the multiplexer is coupled to the transmitter electrodes. The multiplexer may also be coupled to gate lines and/or source lines in the TFT circuitry. In STEP 575, the multiplexer is coupled to an IC by a sensing channel. The IC may be separate from the sensing module. For example, the IC may be located on another flexible printed circuit, discussed above in reference to FIG. 4A and FIG. 4B.

Those skilled in the art, having the benefit of this detailed description, will appreciate that by using the multiplexer, there is no need for multiple channels (i.e., from all the sources) to leave the sensing module. In other words, the multiplexer reduces the need for multiple sensing channels for communication between a sensing module and the IC (e.g., touch IC). This reduces space requirement and cost.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. An input device, comprising:
a first glass layer;
a plurality of transmitter electrodes disposed on the first glass layer and configured for capacitance sensing;
a second glass layer;
a plurality of receiver electrodes disposed on the second glass layer and configured for capacitance sensing; and
a multiplexer disposed on the first glass layer and coupled to a plurality of sources and a sensing channel,
wherein the multiplexer selectively couples one of the plurality of sources to the sensing channel based on at least a control signal, and
wherein the plurality of sources comprises the plurality of transmitter electrodes and the plurality of receiver electrodes.
2. The input device of claim 1, wherein the multiplexer is coupled to the plurality of receiver electrodes by a flexible printed circuit (FPC).
3. The input device of claim 1, wherein the second glass layer is color filter glass, and wherein the first glass layer is thin-film transistor (TFT) glass.
4. The input device of claim 1, wherein the multiplexer couples the sensing channel with the plurality of receiver electrodes while the plurality of receiver electrodes are executing absolute capacitance sensing.
5. The input device of claim 1, wherein the multiplexer couples the sensing channel with the plurality of receiver electrodes through the first FPC while the plurality of transmitter electrodes and the plurality of receiver electrodes are executing mutual capacitance sensing.
6. The input device of claim 1, further comprising:
a plurality of gate lines disposed on the first glass layer and configured to:
generate a display; and
execute absolute capacitance sensing,
wherein the plurality of sources further comprises the plurality of gate lines, and
wherein the multiplexer couples the sensing channel with the plurality of gate lines while the plurality of gate lines are executing absolute capacitance sensing.
7. The input device of claim 1, further comprising:
a plurality of source lines disposed on the first glass layer and configured to:
generate a display; and
execute absolute capacitance sensing,
wherein the plurality of sources further comprises the plurality of source lines, and
wherein the multiplexer couples the sensing channel with the plurality of source lines while the plurality of source lines are executing absolute capacitance.
8. The input device of claim 1, further comprising:
circuitry disposed on the first glass layer;
a display driver integrated controller (IC) disposed on the first glass layer and configured to operate the circuitry to generate a display; and
a flexible printed circuit (FPC) comprising a touch IC that is coupled to the sensing channel and configured to provide the control signal.
9. The input device of claim 1, further comprising:
circuitry disposed on the first glass layer;

a display driver integrated controller (IC) comprising the multiplexer that is configured to operate the circuitry to generate a display; and
a flexible printed circuit (FPC) comprising a touch IC that is coupled to the sensing channel, wherein the touch IC is configured to provide the control signal.

10. The input device of claim 1, further comprising:
circuitry disposed on the first glass layer; and
a touch and display driver integrated controller disposed on the first glass layer that is configured to:
operate the circuitry to generate a display;
provide the control signal; and
couple to the sensing channel.

11. A method for operating an input device, comprising:
receiving, by a multiplexer disposed on first layer, a control signal,
wherein the multiplexer is coupled to a sensing channel and a plurality of sources comprising:
a plurality of transmitter electrodes disposed on the first layer; and
a plurality of receiver electrodes disposed on a second layer;
coupling, by the multiplexer and based on at least the control signal, the sensing channel with a source of the plurality of sources; and
relaying, by the multiplexer, a resulting signal corresponding to capacitance sensing from the source to an integrated controller (IC) coupled to the sensing channel.

12. The method of claim 11, wherein the multiplexer is coupled to the plurality of receiver electrodes by a flexible printed circuit (FPC).

13. The method of claim 11, further comprising:
providing, by the IC, the control signal,
wherein the IC is a touch IC disposed on a flexible printed circuit (FPC).

14. The method of claim 13, wherein the multiplexer is located within a display driver IC disposed on the first layer, and wherein the display driver IC generates a display using thin-film transistor (TFT) circuitry disposed on the first layer.

15. The method of claim 11, further comprising:
providing, by the IC, the control signal,
wherein the IC is a touch and display driver IC that also generates a display using thin-film transistor (TFT) circuitry disposed on the first layer.

16. The method of claim 11, wherein the plurality of sources further comprises a plurality of gate lines and a plurality of source lines disposed on the first layer.

17. The method of claim 16, wherein the plurality of gate lines, the plurality of source lines, and the plurality of transmitter electrodes execute absolute capacitance sensing.

18. A method of manufacturing an input device, comprising:
disposing transmitter electrodes configured for capacitive sensing on a thin-film transistor (TFT) glass layer;
disposing a plurality of receiver electrodes configured for capacitive sensing on a color filter glass layer;
disposing a multiplexer on the TFT glass layer;
coupling the multiplexer to the plurality of receiver electrodes by a first flexible printed circuit (FPC);
coupling the multiplexer to the plurality of transmitter electrodes; and
coupling an integrated controller (IC) to the multiplexer by a sensing channel,
wherein the multiplexer couples, based on at least a control signal provided by the IC, the sensing channel to a source of a plurality of sources comprising the plurality of receiver electrodes and the plurality of transmitter electrodes.

19. The method of claim 18, further comprising:
coupling the multiplexer to a plurality of source lines and a plurality of gate lines disposed on the TFT glass layer,
wherein the plurality of source lines and the plurality of gate lines are configured for generating a display and for absolute capacitance sensing.

20. The method of claim 19, further comprising:
disposing a display driver IC on the TFT glass layer and connecting the plurality of gate lines and the plurality of source lines to the display driver IC,
wherein the IC is a touch IC located on a second FPC.

* * * * *